United States Patent
Landman et al.

(10) Patent No.: US 8,775,689 B2
(45) Date of Patent: Jul. 8, 2014

(54) ELECTRONIC MODULES WITH AUTOMATIC CONFIGURATION

(75) Inventors: Ronald G. Landman, Fargo, ND (US); Nikolai R. Tevs, Fargo, ND (US)

(73) Assignee: Deere & Company, Moline, IL (US)

( * ) Notice: Subject to any disclaimer, the term of this patent is extended or adjusted under 35 U.S.C. 154(b) by 242 days.

(21) Appl. No.: 13/098,590

(22) Filed: May 2, 2011

(65) Prior Publication Data
US 2012/0284441 A1 Nov. 8, 2012

(51) Int. Cl.
G06F 3/00 (2006.01)
G06F 13/00 (2006.01)

(52) U.S. Cl.
USPC ............................................. 710/9; 710/104

(58) Field of Classification Search
USPC ...................................................... 710/104, 9
See application file for complete search history.

(56) References Cited

U.S. PATENT DOCUMENTS

| | | | |
|---|---|---|---|
| 4,438,434 A | 3/1984 | Wason | |
| 5,635,911 A | 6/1997 | Landers et al. | |
| 5,752,047 A | 5/1998 | Darty et al. | |
| 5,815,823 A * | 9/1998 | Engle | 701/19 |
| 5,831,546 A * | 11/1998 | Costa et al. | 340/9.16 |
| 6,838,999 B1 * | 1/2005 | Ropke | 340/9.16 |
| 7,091,876 B2 | 8/2006 | Steger | |
| 7,328,295 B2 | 2/2008 | Yiu et al. | |
| 7,373,224 B2 * | 5/2008 | Goetz et al. | 701/32.6 |
| 7,376,760 B1 | 5/2008 | Ivchenko et al. | |
| 2005/0132109 A1 * | 6/2005 | Steger | 710/104 |
| 2005/0288823 A1 | 12/2005 | Hesse et al. | |
| 2007/0241614 A1 | 10/2007 | Busdiecker et al. | |
| 2009/0316836 A1 | 12/2009 | Wang | |
| 2010/0185841 A1 | 7/2010 | Monreal | |

FOREIGN PATENT DOCUMENTS

| | | |
|---|---|---|
| DE | 1020008044777 A1 | 3/2010 |
| EP | 1981032 | 10/2008 |
| EP | 2154831 A1 | 2/2010 |
| FR | 2821453 A1 | 8/2002 |
| WO | 03094001 A1 | 11/2003 |

OTHER PUBLICATIONS

Drazdil, P. Dual-node position detection extends LIN bus potential. Electronics Components World. Published May 6, 2008. Retrieved from the Internet:<http://www.electronicscomponentsworld.com/articleView~idArticle~71773_223195614652008.html>.
European Search Report dated Dec. 17, 2013 (6 pages).

* cited by examiner

Primary Examiner — Nimesh G Patel (57) ABSTRACT

A first slave electronic module and a second slave electronic module are adapted for communicating over the data bus. The first slave electronic module has a first resistor coupled in series with a main power line. The second electronic module has a second resistor coupled in series with the main power line. A master electronic module has a master current measurement circuit for determining an aggregate current level indicative of the total number of slave electronic modules on the main power line. A first current measurement circuits is capable of measuring a node current indicative of a number of other active slaves connected to the main power line and data bus. A master data processor in the master electronic module is arranged to assign a unique module identifier to a first slave electronic module based on the first node current and the aggregate current level, the unique module identifier indicating a respective position of the first slave electronic module on the data bus.

28 Claims, 2 Drawing Sheets

ELECTRONIC MODULES WITH AUTOMATIC CONFIGURATION

FIELD OF THE INVENTION

This invention relates to electronic modules with automatic configuration or self-configuration capability with respect to a common data bus.

BACKGROUND OF THE INVENTION

A subject electronic device is coupled to a data bus along with at least one other electronic device. The subject electronic device requires a unique identifier or address for unambiguous communication over the data bus. In certain prior art, the unique identifier or address may be pre-programmed into electronically erasable programmable random access memory (EEPROM) of the electronic device, by selecting dual in-line package (DIP) switches, or by other design techniques that are well known to those of skill in the art. In other prior art, self-identifying electronic devices may use current measurements of current on a data bus to determine the location or position of electronic devices coupled to the data bus, which requires complex circuitry to handle both data communications and current measurements on the same data bus. Accordingly, there is a need for an electronic module with automatic configuration or self-configuration capability that uses current measurements on a power supply line to determine the position or location of electronic devices coupled to the data bus.

SUMMARY OF THE INVENTION

In accordance with one embodiment, a system is capable of identification of electronic modules coupled to a data bus. A first slave electronic module and a second slave electronic module are adapted for communicating over the data bus. The first slave electronic module has a first resistor coupled in series with a main power line. The second electronic module has a second resistor coupled in series with the main power line. A master electronic module has a master current measurement circuit for determining an aggregate current level indicative of a total number of slave electronic modules on the main power line. A first current measurement circuit is capable of measuring a first node current or first supply node current indicative of a number of other active slaves connected to the main power line and the data bus. A master microcontroller in the master electronic module is arranged to assign a unique module identifier or address to a first slave electronic module based on the first node current, or based on the first node current and the aggregate current level. The unique module identifier indicates a respective position or address of the first slave electronic module on the data bus.

DESCRIPTION OF THE PREFERRED EMBODIMENTS

Figure 1:
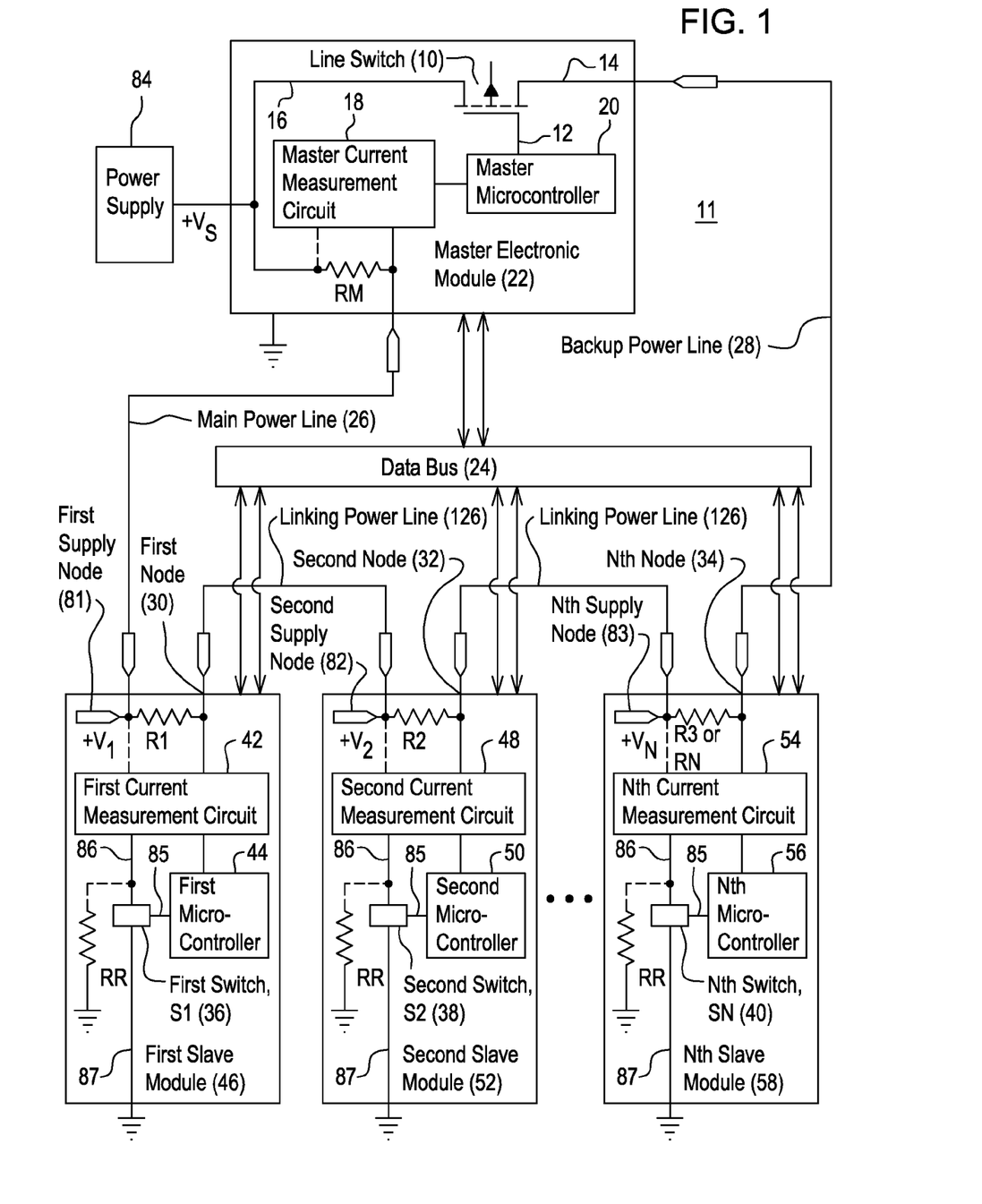
FIG. 1 is a block diagram of a system of electronic modules with automated configuration for communication over a common data bus.

In accordance with one embodiment, in FIG. 1, a system 11 is capable of identification of electronic modules (46, 52, 58) coupled to a data bus 24 and to separate a power line (26 or 28). The data bus 24 may comprise a controller area network (CAN) data bus, an International Standards Organization (ISO) 11783-compliant data bus, or another data bus for communication of data messages or data packets between a set of network elements, controllers or actuators. For example, the data bus 24 may comprise a pair of twisted wires, multi-conductor ribbon cable, multi-conductor cable, or coaxial cable. The power line (26 or 28) may comprise any conductor, wire, wires, cable or multi-conductor cable that provides a path for direct current or alternating current for powering one or more electronic modules. Here, in system 11 the power signal carried on the power line (26 or 28) is not multiplexed or combined with the data messages or data packets on the data bus 2, although it is possible to multiplex or combine the power signal and data messages on the same physical conductor or set of conductors.

In one embodiment, a first slave electronic module 46, a second slave electronic module 52 and an Nth slave electronic module 58 are coupled (e.g., removably coupled) to a data bus 24, or to one or more physical connection positions along the data bus 24 and to a separate power line (26 or 28). The first slave electronic module 46, the second slave electronic module 52 and the Nth slave electronic module 58 are powered by a power supply 84 (e.g., battery) via a daisy-chain conductor configuration or a group of series connections to the main power line 26 and one or more linking power lines 126. During a normal operational mode, the main power line 26 provides electrical energy from a voltage supply 84 to the first salve electronic module 46, whereas one or more linking power lines 126 distribute electrical energy to additional slave electronic modules (52, 58).

In the normal operational mode, the main power line 26 provides electrical energy from a voltage supply or electrical energy source to the first slave electronic module 46. In turn, the first slave electronic module 46 provides electrical energy to the second slave electronic module 52 via the linking power line 126. The second slave electronic module 52 provides electrical energy to the Nth slave electronic module 58 via the linking power line 126.

If the main power line 26 fails (e.g., as an open circuit) between the master electronic module 22 and the first slave electronic module 46, in a backup mode the master electronic module 22 (or its master microcontroller 20) may activate a backup power line 28 to provide backup power or electrical energy to the Nth slave electronic module 58. In turn, in the backup mode the Nth slave electronic module 58 provides electrical energy to the second slave electronic module 52 via the linking power line 126. The second slave electronic module 52 provides electrical energy to the first slave electronic module 46 via the linking power line 126.

Each electronic module (46, 52, 58) has a resistor (R1, R2, RN or R3) coupled in series with the main power line 26, the linking power line 126, or both. During a normal operational mode, distinct from the backup mode, the back-up power line 28 is open or not powered. For example, the master electronic module 22 or the master microcontroller 20 places the line switch 10 in an open state or off state such that no electrical energy is supplied to the back-up power line 28.

In one embodiment, the line switch 10 comprises a semiconductor device, a transistor, or a field effect transistor. For example, the line switch 10 comprises control terminal 12 and two switched terminals (14, 16). The control terminal 12 may comprise a gate or a base of a switch transistor or semiconductor device, whereas the switched terminals (14, 16) may refer to the collector and emitter of a transistor, or the source and drain of a field effect transistor.

Each electronic module (46, 52, 58) comprises a resistor (R1, R2, R3), a current measurement circuit (42, 48, 54), a switch (36, 38, 40) and a microcontroller (44, 50, 56). The microcontroller (44, 50, 56) provides a control signal to the switch (36, 38, 40) via a control terminal 85 and the current measurement device (42, 48 and 54) provides current measurement signal or current measurement data to the microcontroller (44, 50, 56). The current measurement circuit (42, 48, 54) may comprise a transimpedance amplifier, a transresistance amplifier, a differential amplifier for measuring a voltage drop across resistor (R1, R2, R3) for measuring the current at a supply node before entering the electronic module (46, 52, 58) or for measuring a current at an output node leaving the electronic module, so long as the current is measured at the same node for each module to allow for accurate comparison of measured current data within the master electronic module 22.

In one embodiment, a first slave electronic module 46 comprises a first resistor R1, a reference resistor RR, a first switch 36, a first current measurement circuit 42 and a first microcontroller 44. The first resistor R1 is coupled in series with the main power line 26 during normal operation, or coupled in series with the backup power line 28 if the main power line 26 is inactive. A first supply node 81 or a first terminal of the first resistor R1 is connected to the master electronic module 22 via the main power line 26. In the normal operational mode, the second terminal of the first resistor R1 is coupled to the first measurement circuit 42. In the backup mode, the first terminal of the resistor R1 is coupled to the first current measurement circuit 42 as indicated by the dashed line in FIG. 1. The first microcontroller 44 provides or outputs a control signal to switch the first switch 36 on or off via the control terminal 85. The first switch 36 comprises switched terminals (86, 87), where one switched terminal 86 is coupled to the first current measurement circuit 42 and the other switched terminal is coupled to ground potential. As indicated by the dashed lines, in an alternate embodiment, the reference resistance RR may be optional and may represent the load resistance or leakage resistance of other circuitry within the first slave electronic module 46. If present as a discrete device, a load resistance or a leakage resistance, the reference resistance RR provides a high impedance or high resistance path to ground potential and may be coupled to the switched terminal 86. The first current measurement circuit 42 provides a measured current (signal or data) to the first microcontroller 44.

During the normal operational mode, a first supply node 81 is capable of providing electrical energy via a primary current path to components or circuitry of the first slave electronic module 46, whereas the first node 30 is associated with a secondary current path that provides for current measurement by the first current measurement circuit 42 to determine the address, identifier, or connection position of the first slave electronic module 46 for operation on the data bus 24. In one embodiment, the first microcontroller 44 may activate the first switch 36 and the first current measurement circuit 42 during an initialization mode, or when electrical energy is initially applied to one or more of the slave modules (46, 52 and 58) via the power supply 84. For example, the master microcontroller 12 may trigger the initialization mode by communication of one or more data messages over the data bus 24 if the master current measurement circuit 18 detects a material change in aggregate current in the main power line 26 during the normal operational mode or the backup power line 28 during the backup operational mode. The material change in the aggregate current may occur when a new or additional slave electronic module is connected to the main power line 26 via linking power lines 126, for example.

In one embodiment, a second slave electronic module 52 comprises a second resistor R2, a reference resistor RR, a second switch 38, a second current measurement circuit 48 and a second microcontroller 50. The second resistor R2 is coupled in series with the main power line 26 during a normal operational mode, or coupled in series with the backup power line 28 if the main power line 26 is inactive. A second supply node 82 or a first terminal of the second resistor R2 is coupled to the master electronic module 22 via the main power line 26 and via the linking power line 126. The second supply node 82 or the first terminal of the second resistor R2 is connected to the first node 30 (e.g., serial power supply terminal of the first slave module 46) via the linking powerline 126 such that the second supply node 82 receives electrical energy from the first slave electronic module 46. In the normal operational mode, second terminal of the second resistor R2 is coupled to the second node 32. In the backup mode, the first terminal of the second resistor R2 is coupled to the second current measurement circuit 48 as indicated by the dashed line in FIG. 1. The second microcontroller 50 provides or outputs a control signal to switch the second switch 38 on or off via the control terminal 85. The second switch 38 comprises switched terminals (86, 87), where one switched terminal 86 is coupled to the second current measurement circuit 48 and the other switched terminal is coupled to ground potential. As indicated by the dashed lines, in an alternate embodiment, the reference resistance RR may be optional and may represent the load resistance or leakage resistance of other circuitry within the second slave electronic module 52. If present as a discrete device, a load resistance or a leakage resistance, the reference resistance RR provides a high impedance or high resistance path to ground potential and may be coupled to the switched terminal 86. The second current measurement circuit 48 provides a measured current (signal or data) to the second microcontroller 50.

During the normal operational mode, the second supply node 82 is capable of providing electrical energy via a primary current path to components or circuitry of the second slave electronic module 52, whereas the second node 32 is associated with a secondary current path that provides for current measurement by the second current measurement circuit 48 to determine the address, identifier, or connection position of the second slave electronic module 52 for operation on the data bus 24. In one embodiment, the second microcontroller 50 may activate the second switch 38 and the second current measurement circuit 48 during an initialization mode, or when electrical energy is initially applied to one or more of the slave modules (46, 52 and 58) via the power supply 84. For example, the master microcontroller 12 may trigger the initialization mode via communication of one or more data messages via the data bus 24 if the master current measurement circuit 18 detects a material change in aggregate current in the main power line 26 during the normal operational mode or the backup power line 28 during the backup operational mode. The material change in the aggregate current may occur when a new or additional slave electronic module is connected to the main power line 26 via linking power lines 126, for example.

In one embodiment, an Nth slave electronic module 58 comprises an Nth resistor (R3 or RN), a reference resistor RR, an Nth switch 40, an Nth current measurement circuit 54 and an Nth microcontroller 56. The Nth resistor (R3 or RN) is coupled in series with the main power line 26 during a normal operational mode, or coupled in series with the backup power line 28 if the main power line 26 is inactive. An Nth supply node 83 or a first terminal of the Nth resistor (R3 or RN) is coupled to the master electronic module 22 via the main power line 26 and via the linking power line 126. The Nth supply node 83 or the first terminal of the Nth resistor (R3 or RN) is connected to the second node 32 (e.g., the serial power supply terminal of the second slave electronic module 52) via the linking powerline 126 such that the Nth supply node 82 receives electrical energy from the second slave electronic module 52. In the normal operational mode, the second terminal of the Nth resistor (R3 or RN) is coupled to the Nth current measurement circuit 54. In the backup mode, the first terminal of the Nth resistor (R3 or RN) is coupled to the Nth current measurement circuit 54 as indicated by the dashed lines in FIG. 1. As indicated by the dashed lines, in an alternate embodiment, the reference resistance RR may be optional and may represent the load resistance or leakage resistance of other circuitry within the Nth slave electronic module 58. If present as a discrete device, a load resistance or a leakage resistance, the reference resistance RR provides a high impedance or high resistance path to ground potential and may be coupled to the switched terminal 86. The Nth microcontroller 56 provides or outputs a control signal to switch the Nth switch 40 on or off via the control terminal 85 (e.g., to provide a lower resistance or impedance path to ground than reference resistance RR for certain current measurements). The Nth current measurement circuit 54 provides a measured current (signal or data) to the Nth microcontroller 56.

During the normal operational mode, an Nth supply node 83 is capable of providing electrical energy via a primary current path to components or circuitry of the Nth slave electronic module 58, whereas the Nth node 34 is associated with a secondary current path that provides for current measurement by the Nth current measurement circuit 54 to determine the address, identifier, or connection position of the Nth slave electronic module 58 for operation on the data bus 24. In one embodiment, the Nth microcontroller 56 may activate the Nth switch 40 and the Nth current measurement circuit 54 during an initialization mode, or when electrical energy is initially applied to one or more of the slave modules (46, 52 and 58) via the power supply 84. For example, the master microcontroller 12 may trigger the initialization mode via communication of one or more data messages via the data bus 24 if the master current measurement circuit 18 detects a material change in aggregate current in the main power line 26 during the normal operational mode or the backup power line 28 during the backup operational mode. The material change in the aggregate current may occur when a new or additional slave electronic module is connected to the main power line 26 via linking power lines 126, for example.

FIG. 1 shows N is equal to any positive whole number greater than three, where the three dots between the second slave module 52 and the Nth slave module 58 indicate the possibility of additional electronic modules coupled to the power line 26 and the data bus 24. In an alternate embodiment, N may be equal to any positive whole number greater than two.

In one configuration, the master electronic module 22 comprises a master microcontroller 20, a master current measurement circuit 18, a line switch 10, a master resistor RM. The master resistor RM is in series with the main power line 26 and supports taking regular or periodic samples of the aggregate current to determine whether a material change in the aggregate current has occurred because of a new or additional slave electronic module is connected to the main power line 26 via one or more linking power lines 126, for example.

The master current measurement circuit 18 is capable of measuring the aggregate current in the main power line 26 or the aggregate current to backup power line 28. In one configuration, the master current measurement circuit 18 may measure a voltage drop across the resistor RM via the solid and dashed line of FIG. 1 to estimate the corresponding measurement current. In another configuration, the master current measurement circuit 18 may measure current via a transresistance amplifier or a transimpedance amplifier that outputs a voltage indicative of the current flowing through RM, where the master current measurement circuit 18 measures current on the main power line 26 during normal operational mode or on the backup power line 28 via the dashed line in FIG. 1 during a backup operational mode. The master microcontroller 20 controls the line switch 10 to determine whether the backup power line 28 or the main power line 26 is active. For example, the master microcontroller 20 has an analog or digital output coupled to a control terminal 12 (e.g., gate or base) of the line switch 10. The control terminal 12 determines whether the switched terminals (14, 16) or in an open state or closed state with respect to each other.

In one embodiment, the first slave electronic module 46, a second slave electronic module 52, an Nth slave electronic module 58, and a master electronic module 22 are capable of communicating data (e.g., between any two modules) over the data bus 24. The first slave electronic module 46 has a first resistor R1 coupled in series with the main power line 26. The second slave electronic module 52 has a second resistor R2 coupled in series with the main power line 26 and the linking power line 126. The Nth slave electronic module 58 has an Nth resistor (R3 or RN) coupled in series with the main power line 26 and linking power lines 126. A master electronic module 22 has a master current measurement circuit 18 for determining an aggregate current level indicative of the total number of slave electronic modules (46, 52, 58) on the main power line 26.

In the first slave electronic module 46, a first current measurement circuit 42 is capable of measuring a first node current indicative of one or more of the following: (1) a physical position of the first slave electronic module 46 on the main power line 26 or linking power lines 126, (2) a physical position of the first slave electronic module 46 on the data bus 24, and (3) a number of other active slaves connected to the main power line 26 and data bus 24. In one illustrative configuration, in the normal operational mode the first node current is associated with the current flowing through the first node 30 when: (1) the first switch 36 is active or in a closed state between switched terminals (86, 87), (2) the second switch 38 is in an open state or closed state (e.g., inactive or active state) between its switched terminals (86, 87), and (3) the Nth switch 40 is in an open state or closed state (e.g., inactive or active state) between its switched terminals (86, 87), where the first current measurement circuit 42 is associated with a shunted (e.g., switchable) path to ground. In another illustrative embodiment for measurement of an aggregate current level, the first node current is associated with the aggregate current flowing through the first node 30 when: (1) the first switch 36 is inactive or in an open state between switched terminals (86, 87), (2) the second switch 38 is inactive or in an open state between its switched terminals (86, 87), and (3) the Nth switch 40 is active or in a closed state between its switched terminals (86, 87), and where only the Nth current measurement circuit 54 is associated with a shunted (e.g., switchable) path to ground such that the first node current (e.g., or the current through any resistor, R1, R2, or R3) is representative of the number of slave modules (46, 52, 58) coupled to in series to the power line 26 and at least one linking power line 126. In yet another embodiment, the first node current comprises a current when the current is flowing through the first resistor R1 of the first slave electronic module 46 and no other series resistor (R2, R3) of any other slave electronic module (52, 58), where the series resistor is in series with the power line 26 or linking power line 126.

The first microcontroller 44 or first slave module 46 may report the measured first node current to the master electronic module 22 via the data bus 24 in a data message (e.g., data packet). In response to receipt of one or more data messages from the electronic modules and current measurement data from the master current measurement circuit 18, the master microcontroller in the master electronic module 22 assigns a unique module identifier or address to the first slave electronic module 46 based on (1) the first node current or (2) the first node current and the aggregate current level. Depending upon the state of the switches (36, 38, 40), the first node current may be representative of the aggregate current level or a current level associated with an identity, position or address of an individual slave module. In one configuration, the first current measurement circuit 42 in the first slave electronic module 46 is capable of measuring a first node current indicative of a number of other active slaves already connected to the main power line 26 and data bus 24. The unique module identifier or unique address indicates a respective physical position of the first slave electronic module 46 on the data bus 24, or provides the master electronic module 22 the ability to communicate with each slave module on an individual basis (e.g., round robin, polling or otherwise), for example. Further, the unique module identifier or unique address assigned to the slave electronic modules may support collective communications or a group communication to all slave electronic modules simultaneously or in quick serial succession.

In the second slave electronic module 52, a second current measurement circuit 48 is capable of measuring a second node current indicative (at the second node 32) of one or more of the following: (1) a physical position of the second slave electronic module 52 on the main power line 26 or linking power lines 126, (2) a physical position of the second slave electronic module 52 on the data bus 24, and (3) a number of other active slaves connected to the main power line 26 and data bus 24. In one illustrative configuration, in the normal operational mode the second node current is associated with the current flowing through the second node 30 when: (1) the second switch 38 is active or in a closed state between switched terminals (86, 87), (2) the first switch 36 is inactive or in an open state between its switched terminals (86, 87), and (3) the Nth switch 40 is in an open state or closed state (e.g., active or inactive) between its switched terminals (86, 87), where the second current measurement circuit 48 is associated with a shunted (e.g., switchable) path to ground. In another illustrative embodiment for measurement of an aggregate current level, the second node current is associated with the aggregate current flowing through the second node 30 when: (1) the second switch 38 is inactive or in an open state between switched terminals (86, 87), (2) the first switch 36 is inactive or in an open state between its switched terminals (86, 87), and (3) the Nth switch 40 is active or in a closed state between its switched terminals (86, 87), and where only the Nth current measurement circuit 54 is associated with a shunted (e.g., switchable) path to ground such that the second node current (e.g., or the current through any resistor, R1, R2, or R3) is representative of the number of slave modules (52, 58) coupled to in series to the power line 26 and at least one linking power line 126. In yet another embodiment, the second node current comprises a current when the current is flowing through the series first resistor R1 of the first slave electronic module 46 and the series second resistor R2 of the second slave electronic module 52, and not the series Nth resistor, which is referred to as R3 or RN.

The second microcontroller 50 or second slave module 52 may report the measured second node current to the master electronic module 22 via the data bus 24 in a data message (e.g., data packet). In response to receipt of one or more data messages from the electronic modules and current measurement data from the master current measurement circuit 18, the master microcontroller 20 in the master electronic module 22 assigns a unique module identifier or address to the second slave electronic module 52 based on (1) the second node current or (2) the second node current and the aggregate current level. Depending upon the state of the switches (36, 38, 40), the second node current may be representative of the aggregate current level or a current level associated with an identity, position or address of an individual slave module. In one configuration, the second current measurement circuit 48 in the second slave electronic module 52 is capable of measuring a second node current indicative of a number of other active slaves already connected to the main power line 26 and data bus 24. The unique module identifier or unique address indicates a respective physical position of the second slave electronic module 52 on the data bus 24, or provides the master electronic module 22 the ability to communicate with each slave module on an individual basis (e.g., round robin, polling or otherwise), for example. Further, the unique module identifier or unique address assigned to the slave electronic modules may support collective communications or a group communication to all slave electronic modules simultaneously or in quick serial succession.

In the Nth slave electronic module 58, an Nth current measurement circuit 54 is capable of measuring a Nth node current indicative (at the Nth node 34) of one or more of the following: (1) a physical position of the Nth slave electronic module 58 on the main power line 26 or linking power lines 126, (2) a physical position of the Nth slave electronic module 58 on the data bus 24, and (3) a number of other active slaves connected to the main power line 26 and data bus 24. In one illustrative configuration, in the normal operational mode the Nth node current is associated with the current flowing through the Nth node 34 when: (1) the Nth switch 40 is active or in a closed state between switched terminals (86, 87), (2) the first switch 36 is inactive or in an open state between its switched terminals (86, 87), and (3) the second switch 36 is inactive or in an open state between its switched terminals (86, 87), where the Nth current measurement circuit 54 is associated with a shunted (e.g., switchable) path to ground. In another illustrative embodiment, the Nth node current is approximately equal to the aggregate current flowing through the Nth node 30 when: (1) the Nth switch 40 is active or in an closed state between switched terminals (86, 87), (2) the first switch 36 is inactive or in an open state between its switched terminals (86, 87), and (3) the second switch 38 is active or in a closed state between its switched terminals (86, 87), and where only the Nth current measurement circuit 54 is associated with a shunted (e.g., switchable) path to ground such that the Nth node current (e.g., or the current through any resistor, R1, R2, or RN) is representative of the number of slave modules (58, 58, 58) coupled to in series to the power line 26 and at least one linking power line 126. In other words, the Nth node current is equal to the aggregate current level, which comprises a current when the current is flowing through the first resistor R1 of the first slave electronic module 46, the second resistor R2 of the second slave electronic module 52, and the Nth resistor RN of the Nth slave electronic module 58.

The Nth microcontroller 56 or Nth slave module 58 may report the measured Nth node current to the master electronic module 22 via the data bus 24 in a data message (e.g., data packet). In response to receipt of one or more data messages from the electronic modules and current measurement data from the master current measurement circuit 18, the master microcontroller 20 in the master electronic module 22 assigns a unique module identifier or address to the Nth slave electronic module 58 based on (1) the Nth node current or (2) the Nth node current and the aggregate current level. Depending upon the state of the switches (36, 40, 40), the Nth node current may be representative of the aggregate current level or a current level associated with an identity, position or address of an individual slave module. In one configuration, the Nth current measurement circuit 54 in the Nth slave electronic module 58 is capable of measuring an Nth node current indicative of a number of other active slaves already connected to the main power line 26 and data bus 24. The unique module identifier or unique address indicates a respective physical position of the Nth slave electronic module 58 on the data bus 24, or provides the master electronic module 22 the ability to communicate with each slave module on an individual basis (e.g., round robin, polling or otherwise), for example. Further, the unique module identifier or unique address assigned to the slave electronic modules may support collective communications or a group communication to all slave electronic modules simultaneously or in quick serial succession.

In one configuration, the first current measurement circuit 42 is adapted to measure sequentially the first node current of the first node 30 and the second current measurement circuit 48 is adapted to measure sequentially the second node current of the second node 32. In one example, the first slave electronic module 46 comprises a first switch 36 to form a path (e.g., a lower resistance path than reference resistor RR) to ground for the first current measurement circuit 42 during measurement of the first node current. In another example, the second slave electronic module 52 comprises a second switch 38 to form a path (e.g., a lower resistance path than reference resistor RR) to ground for the second current measurement circuit 48, such that the second current measurement circuit 48 during measurement of the second node current.

In one embodiment, the first node current at the first node 30 comprises a current where no other slave electronic module is active or where no material current (e.g., greater than a reference current) is flowing through any resistor (e.g., R2 or RN) of any other slave module. The second node current comprises a current at the second node 32 where the second slave electronic module 52 is active or where no material current (e.g. greater than a reference current) is flowing through any resistor of any other slave module.

In one configuration, each slave electronic module is arranged to measure current sequentially starting from an upstream slave node closest to the master electronic module 22 along the main power line 26 (and its linking power lines 126) to a downstream slave node (e.g., Nth slave electronic module) farthest from the master electronic module 22, where each upstream electronic slave module has a resistor (e.g., R1, R2) in series with the main power line 26 during the sequential current measurement. In one embodiment, wherein N equal a positive whole number greater than or equal to three, the system further comprises a second slave electronic module 52.

The second slave electronic module 52 is adapted for communicating over the data bus 24. The second electronic module has a second resistor R2 coupled in series with the main power line 26 to provide a second incremental decrease in the aggregate current level of the main power line 26 when the second slave electronic module 52 is connected to the data bus 24 and the main power line 26. A second current measurement circuit 48 is in the second slave electronic module 52. The second current measurement circuit 48 is capable of measuring a second node 32 current indicative of number of other active slaves already connected to the main power line 26 and data bus 24.

In the following set of examples, the first switch 36, the second switch 38 and the Nth switch 40 are open, off or disabled, and the reference resistor RR or other circuitry of the slave module is used to provide a load or leakage current to ground for each slave module. In a first example, the first switch 36, the second switch 38 and the Nth switch 40 are open, off or disabled, such that the current entering the first slave module 46 at the first supply node 81 is the sum of first leakage current in first slave module 46, the second leakage current in second slave module 52 and Nth leakage current in the Nth slave module 58 of the reference resistors RR.

In a second example, the first switch 36, the second switch 38 and the Nth switch 40 are open, off or disabled, such that the current entering the second slave module 52 at the second supply node 82 is the sum of the second leakage current in the second slave module 52 and Nth leakage current of the Nth slave module 58 of the reference resistors RR.

In a third example, the first switch 36, the second switch 38 and the Nth switch 40 are open, off or disabled, such that the current entering the Nth slave module 46 at the first supply node 81 is the sum of Nth leakage current of the reference resistors RR in the Nth slave module 58.

In a fourth example, the slave modules of the first three examples transmit a measured leakage current or load current and an identifier to the master electronic module 22. The master electronic module then sorts the received leakage current or master currents in order of increasing or decreasing current. The sorted order represents the serial connection order of the slave modules (46, 52, 58) on the data bus 24. By combining the sorted order with the known wiring schematic or harness design, the master electronic module 22 has the necessary information required to associate each controller with a physical position or location on the machine, equipment, or vehicle. Accordingly, the master electronic module 22 may generate and send commands to the slave modules (46, 52, 58) consistent with unique addresses that are assigned to known positions or physical locations on the machine, equipment or vehicle.

The system 11 of FIG. 1 may be configured for identifying up to N electronic modules coupled to the data bus 24 and direct current power line (e.g., main power line 26 and linking power lines 126, individually or collectively), where N is any positive whole number greater than or equal to two.

Figure 2:
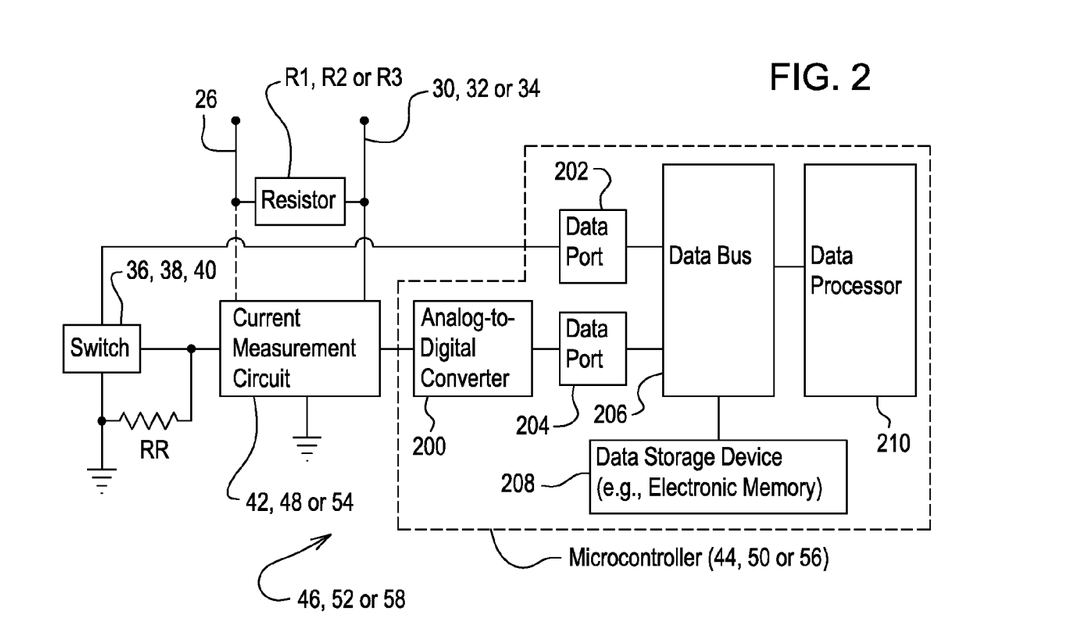
FIG. 2 is a block diagram of an illustrative electronic module in more detail than FIG. 1.

FIG. 2 provides an illustrative embodiment of any slave electronic module (46, 52 or 58) of FIG. 1. The slave electronic module of FIG. 2 comprises a microcontroller (44, 50 or 56) coupled a control terminal of switch (36, 38, 40) and a current measurement circuit (42, 52 or 58), consistent with FIG. 1. Like reference numbers in FIG. 1 and FIG. 2 indicate like elements.

FIG. 2 shows on possible configuration of the microcontroller (44, 50 or 56) in greater detail than FIG. 1 does. The microcontroller comprises an electronic data processor 210, a data storage device 208, and data ports (202, 204) coupled to a data bus 206. In one configuration, a data port 204 is coupled to an analog-to-digital converter 200 to support conversion of analog current data to digital current measurement data for processing by the data processor 210. The current measurement circuit (42, 48, 54) provides analog current measurement data, for example.

The data processor 210 may comprise a microprocessor, a microcontroller, a programmable logic array, an application specific integrated circuit, a digital signal processor, or another electronic device for processing, manipulating, inputting, or outputting data.

The data storage device 208 may comprise electronic memory, non-volatile random access memory, a magnetic storage device, an optical storage device, or another device for storing data. The data storage device 208 may store software program instructions for one or more of the following in a non-transitory or permanent storage media: (a) engaging in an initialization procedure when a new or additional slave electronic module is plugged in or powered up, (b) taking current measurements at the first, second or third nodes (30, 32, 34), or (c) determining the identifiers or addresses for respective slave electronic modules (46, 52, 58) based on the current measurements.

Each data port (202, 204) may comprise an input port, an output port, an input/output port, a universal asynchronous receiver/transmitter (UART), a transceiver, a buffer memory, or the like.

The analog-to-digital converter 200 may comprise any suitable electronic device for converting analog signal into a digital data representation. The switch (36, 38, 40) may comprise a semiconductor switch, such as a transistor or field effect transistor.

The current measurement circuit (42, 52, 54) may comprise a device for measuring a direct current provided via the main power line 26 or the back-up power line 28. For example, the current measurement circuit may detect or measure the current at a first node 30, a second node 32 or third node 34.

Figure 3:
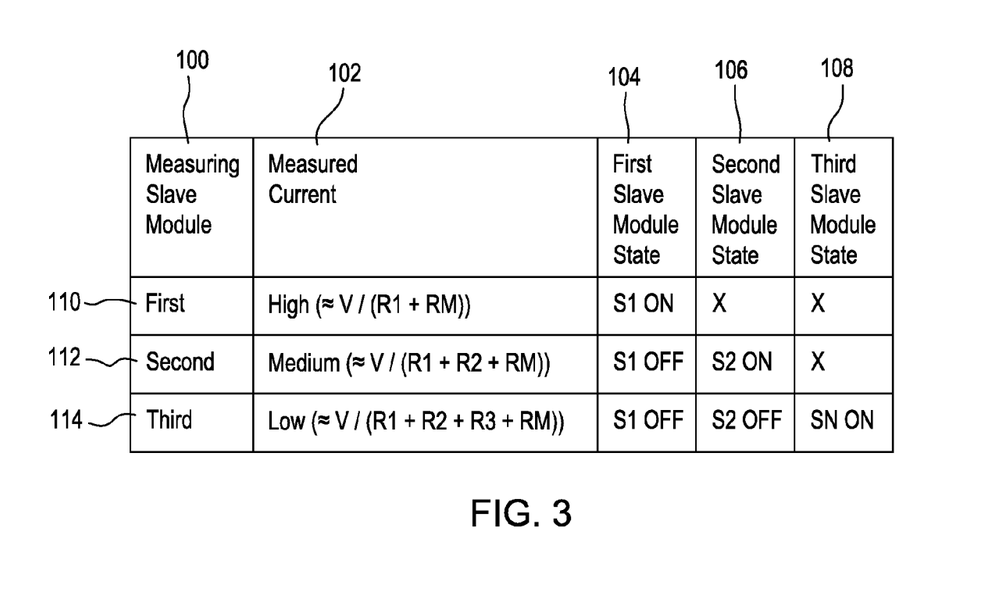
FIG. 3 is a chart of the measured currents at corresponding slave electronic modules within the system.

FIG. 3 is a chart of the measured currents at corresponding slave electronic modules (46, 52, 58) within the system 11 when the system is operating in the normal operational mode with a live or active main power line 26. The first column 100 of FIG. 2 identifies the measuring slave electronic module (46, 52 or 58), in the example where N equals three. The second column 102 lists the respective measured current (e.g., approximate current) at each corresponding slave electronic module or measurement node (30, 32, 34) when the other electronic modules are in the states listed in the third through fifth columns of the chart. The third column 104 lists whether the first switch, S1 (36) is on or off. If the first switch 36 is on, a low resistance path to ground is provided for the first current measurement circuit 42, whereas if the first switch 36 is off, a high resistance path or high impedance path to ground is provided. The fourth column 106 lists whether the second switch, S2 (38) is on or off. If the second switch 38 is on, a low resistance path to ground is provided for the second current measurement circuit 48, whereas if the second switch 38 is off, a high resistance path or high impedance path to ground is provided. The fifth column 108 lists whether the Nth switch, SN (40) is on or off. If the Nth switch 40 is on, a low resistance path to ground is provided for the Nth current measurement circuit 54, whereas if the Nth switch 40 if off, a high resistance path or high impedance path to ground is provided. In the chart of FIG. 3, "X" refers to a don't care state in which a switch may be on or off.

Any data processor 210 or the master microcontroller 20 may use the first column 100 and the second column 102 of the chart to determine the position, sequence or order of how the electronic modules are coupled to the data bus 24 (e.g., and its corresponding main power line 26).

In one example, shown in the first row 110, the first slave electronic module 46 or its first measurement circuit 42 provides a measured current that is approximately equal to V/(R1+RM). The first slave electronic module 46 reports the measured current to the master electronic module 22. The master microcontroller 20 or master electronic module 22 may use a look-up table similar to FIG. 2, a file (e.g. inverted file), a data record, data base or other data structure to identify the value of the measured current at the first node 30. Once the value of the measured current is identified as approximately equal to V/(R1+RM), the corresponding measuring slave is identified as the first slave electronic module 46, which is closest to or immediately downstream from the master electronic module 22.

In one example, shown in the second row 112, the second slave electronic module 52 or its second measurement circuit 48 provides a measured current at the second node 32 that is approximately equal to (or proportional to) V/(R1+R2+RM). The second slave electronic module 52 reports the measured current to the master electronic module 22. The master microcontroller 20 or master electronic module 22 may use a look-up table similar to FIG. 2, a file (e.g. inverted file), a data record, data base or other data structure to identify the value of the measured current at the second node 32. Once the value of the measured current is identified as approximately equal to (or proportional to) V/(R1+R2+RM), the corresponding measuring slave is identified as the second slave electronic module 52, which is second closest to or second in sequence downstream from the master electronic module 22.

In one example, shown in the third row 114, the Nth slave electronic module 58 (or third slave electronic module where N equals three) or its Nth measurement circuit 54 provides a measured current at the Nth node 34 that is approximately equal to (or proportional to) V/(R1+R2+R3+RM). The Nth slave electronic module 58 reports the measured current to the master electronic module 22. The master microcontroller 20 or master electronic module 22 may use a look-up table similar to FIG. 2, a file (e.g. inverted file), a data record, data base or other data structure to identify the value of the measured current at the Nth node 34. Once the value of the measured current is identified as approximately equal to V/(R1+R2+R3+RM), the corresponding measuring slave is identified as the third or Nth slave electronic module 54, which is farthest from the master electronic module 22.

The system described in this document is well-suited for identifying the physical location of electronic modules and assigning addresses or identifiers for corresponding electronic modules. In certain embodiments of the system, the relative current level of the load current consumed by each electronic module is used to determine (e.g., the order of) the physical location or identifier for any electronic module, such that the absolute current level consumed by any electronic module does not require measurement or complex circuitry for precise current measurements. If new or replacement electronic modules are replaced, swapped or plugged in during maintenance, the new module or replacement module is automatically and readily assigned a unique unambiguous identifier without the hassle of software programming or reprogramming (e.g., without entering system configuration data into a user interface) in accordance with the system features described in this document.

Having described the preferred embodiment, it will become apparent that various modifications can be made without departing from the scope of the invention as defined in the accompanying claims.

The following is claimed:

1. A system for identification of electronic modules coupled to a data bus, the system comprising:
   a data bus;
   a main power line;
   a backup power line;
   a first slave electronic module for communicating over the data bus, the first slave electronic module having a first resistor coupled in series with the main power line when the first slave electronic module is connected to the data bus, where during a normal operational mode the first slave electronic module is coupled to the main power line and during a backup mode the first slave electronic module is coupled to the backup power line;
   a second slave electronic module for communicating over the data bus, the second electronic module having a second resistor coupled in series with the main power line when the second slave electronic module is connected to the data bus, where during a normal operational mode the second slave electronic module is coupled to the main power line and during a backup mode the second slave electronic module is coupled to the backup power line;
   a master electronic module having a master current measurement circuit for determining an aggregate current level indicative of the total number of slave electronic modules on the main power line during the normal operational mode or on the backup power line during the backup mode;
   a first current measurement circuit in the first slave electronic module, the first current measurement circuit capable of measuring a first node current indicative of a number of other active slave electronic modules connected to the data bus and the main power line or the backup power line;
   a master data processor in the master electronic module for assigning a unique module identifier to the first slave electronic module based on the first node current and the aggregate current level, the unique module identifier indicating a respective position of the first slave electronic module on the data bus.

2. The system according to claim 1 further comprising:
   a second current measurement circuit in the second slave electronic module, the second current measurement circuit capable of measuring a second node current indicative of a number of other active slave electronic modules already connected to the main power line and data bus; and
   the master data processor adapted to assign a module identifier to a second slave electronic module based on the second node current and the aggregate current level, the unique module identifier indicating a respective position of the second slave electronic module on the data bus.

3. The system according to claim 2 wherein the first current measurement circuit is adapted to measure sequentially the first node current and wherein the second current measurement circuit is adapted to measure sequentially the second node current.

4. The system according to claim 2 wherein the first slave electronic module comprises a first switch to form a path to ground for the first current measurement circuit during measurement of the first node current.

5. The system according to claim 2 wherein the second slave electronic module comprises a second switch to form a path to ground for the second current measurement circuit during measurement of the second node current.

6. The system according to claim 1 wherein the first node current comprises a current where no other slave electronic module is active or when no current is flowing through any resistor of any other slave module.

7. The system according to claim 1 wherein the second node current comprises a current when the current is flowing through the first resistor of the first slave electronic module and the second resistor of the second slave electronic module.

8. The system according to claim 1 wherein each slave electronic modules is arranged to measure current sequentially starting from an upstream slave node closest to the master electronic module along the main line to a downstream slave node farthest from the master electronic module, where each upstream electronic slave module has a resistor in series with the main power line during the sequential current measurement.

9. The system according to claim 1 further comprising:
   a line switch for selecting the main power line or the backup power line, where the backup power line is connected directly to a node of a last slave electronic module to first provide current to the last slave electronic module on the data bus if the main power line is not providing current to the first node of the first slave electronic module.

10. The system according to claim 1 further comprising:
    a line switch for selecting the main power line or the backup power line, where the backup power line is connected directly to an Nth node of an Nth slave electronic module to first provide electrical energy to the Nth slave electronic module on the data bus, the Nth slave electronic module providing electrical energy to the second slave electronic module via a linking power line, and the second slave electronic module providing electrical energy to the first slave electronic module via another linking power line.

11. A system for identification of electronic modules coupled to a data bus, the system comprising:
    a data bus;
    a main power line;
    a backup power line;
    a first slave electronic module for communicating over the data bus, the first slave electronic module having a first resistor coupled in series with the main power line to provide a first incremental decrease in an aggregate current level of the main power line when the first slave electronic module is connected to the data bus, where during a normal operational mode the first slave electronic module is coupled to the main power line and during a backup mode the first slave electronic module is coupled to the backup power line;
    an Nth slave electronic module for communicating over the data bus, the second electronic module having a second resistor coupled in series with the main power line to provide a second incremental decrease in the aggregate current level of the main power line when the Nth slave electronic module is connected to the data bus, where during a normal operational mode the Nth slave electronic module is coupled to the main power line and during a backup mode the Nth slave electronic module is coupled to the backup power line; and
    a master electronic module having a master current measurement circuit for determining the aggregate current level indicative of the total number of slave electronic modules on the main power line during the normal operational mode or on the backup power line during the backup mode;

a first current measurement circuit in the first slave electronic module, the first current measurement circuit capable of measuring a first node current indicative of a number of other active slave electronic modules connected to the data bus and the main power line or the backup power line; and a master data processor in the master electronic module for assigning a unique module identifier to the first electronic module based on the first node current and the aggregate current level, the unique module identifier indicating a respective position of the first slave electronic module on the data bus.

12. The system according to claim 11 further comprising:
an Nth current measurement circuit in the Nth slave electronic module, the Nth current measurement circuit capable of measuring an Nth node current indicative of number of other active slaves already connected to the main power line and data bus; and
the master data processor is adapted to assign a module identifier to an Nth slave electronic module based on the Nth node current and the aggregate current level, the unique module identifier indicating a respective position of the Nth slave electronic module on the data bus.

13. The system according to claim 11 wherein the first current measurement circuit is adapted to measure sequentially the first node current and wherein the Nth current measurement circuit is adapted to measure sequentially the Nth node current.

14. The system according to claim 11 wherein the first slave electronic module comprises a first switch and wherein the Nth slave electronic module comprises an Nth switch, the first switch providing a path to ground for the first current measurement circuit during measurement of the first node current, the second switch providing a path to ground for the second current measurement circuit during measurement of the second node current.

15. The system according to claim 11 wherein the first node current comprises a current when no current is flowing through any resistor of any other slave electronic module.

16. The system according to claim 11 wherein the Nth node current comprises a current when the current is flowing through the Nth resistor through the first resistor, inclusive.

17. The system according to claim 11 wherein each slave electronic modules is arranged to measure current sequentially starting from an upstream slave node closest to the master electronic module along the main line to a downstream slave node farthest from the master electronic module, where each upstream electronic slave module has a resistor in series with the main power line during the sequential current measurement.

18. The system according to claim 11 wherein N equals a positive whole number greater than or equal to 2.

19. The system according to claim 11 wherein N equals a positive whole number greater than or equal to 3 and further comprising:
a second slave electronic module for communicating over the data bus, the second electronic module having a second resistor coupled in series with the main power line to provide a second incremental decrease in the aggregate current level of the main power line when the second slave electronic module is connected to the data bus and the main power line; and
a second current measurement circuit in the second slave electronic module, the second current measurement circuit capable of measuring a second node current indicative of number of other active slaves already connected to the main power line and data bus.

20. A system for identification of electronic modules coupled to a data bus, the system comprising:
a data bus;
a main power line;
a backup power line;
a first slave electronic module for communicating over the data bus, the first slave electronic module having a first resistor coupled in series with the main power line when the first slave electronic module is connected to the data bus, where during a normal operational mode the first slave electronic module is coupled to the main power line and during a backup mode the first slave electronic module is coupled to the backup power line;
a second slave electronic module for communicating over the data bus, the second electronic module having a second resistor coupled in series with the main power line when the second slave electronic module is connected to the data bus, where during a normal operational mode the second slave electronic module is coupled to the main power line and during a backup mode the second slave electronic module is coupled to the backup power line;
a first current measurement circuit in the first slave electronic module, the first current measurement circuit capable of measuring a first supply node current indicative of a number of other active slave electronic modules connected to the data bus and the main power line or the backup power line;
a second current measurement circuit in the second slave electronic module, the second current measurement circuit capable of measuring a second supply node current indicative of a number of other active slave electronic modules connected to the main power line and data bus during the normal operational mode or on the backup power line during the backup mode; and
a master microcontroller in the master electronic module for assigning a unique module identifier to the first slave electronic module based on the first supply node current and the second supply node current, the unique module identifier indicating a respective position of the first slave electronic module on the data bus.

21. The system according to claim 20 where the first slave electronic module has a greater first supply node current that the second supply node current of the second module.

22. The system according to claim 20 further comprising:
an Nth slave electronic module for communicating over the data bus, the Nth electronic module having an Nth resistor coupled in series with the main power line when the second slave electronic module is connected to the data bus and the main power line, where N is any positive whole number greater than three;
an Nth current measurement circuit in the Nth slave electronic module, the Nth current measurement circuit capable of measuring an Nth supply node current indicative of a number of other active slave electronic modules connected to the main power line and data bus; and
the master microcontroller in the master electronic module adapted to assign a unique module identifier to the Nth slave electronic module based on the first supply node current, the second supply node current, and the Nth supply current, the unique module identifier indicating a respective position of the first slave electronic module on the data bus.

23. The system according to claim 20 where the Nth slave electronic module has a lowest supply node current, which is lower than the first supply node current and the second supply node current.

24. A system for identification of electronic modules coupled to a data bus, the system comprising:
- a data bus;
- a main power line;
- a backup power line;
- a first slave electronic module for communicating over the data bus, the first slave electronic module having a first resistor coupled in series with the main power line when the first slave electronic module is connected to the data bus, where during a normal operational mode the first slave electronic module is coupled to the main power line and during a backup mode the first slave electronic module is coupled to the backup power line;
- a second slave electronic module for communicating over the data bus, the second electronic module having a second resistor coupled in series with the main power line when the second slave electronic module is connected to the data bus, where during a normal operational mode the second slave electronic module is coupled to the main power line and during a backup mode the second slave electronic module is coupled to the backup power line;
- a master electronic module having a master current measurement circuit for determining an aggregate current level indicative of the total number of slave electronic modules on the main power line during the normal operational mode or on the backup power line during the backup mode;
- a first current measurement circuit in the first slave electronic module, the first current measurement circuit capable of measuring a first node current indicative of a number of other active slave electronic modules connected to the data bus and the main power line or the backup power line;
- a master data processor in the master electronic module for assigning a unique module identifier to the first slave electronic module based on the first node current and the aggregate current level, the unique module identifier indicating a respective position of the first slave electronic module on the data bus, wherein the master data processor is configured to trigger an initialization mode if the master current measurement circuit detects a material change in the aggregate current in the main power line during a normal operational mode, where the material change is indicative of a new or additional slave electronic module coupled to the main power line via linking power lines.

25. The system according to claim 24 further comprising:
- a second current measurement circuit in the second slave electronic module, the second current measurement circuit capable of measuring a second node current indicative of a number of other active slave electronic modules already connected to the main power line and data bus; and
- the master data processor adapted to assign a module identifier to a second slave electronic module based on the second node current and the aggregate current level, the unique module identifier indicating a respective position of the second slave electronic module on the data bus.

26. The system according to claim 25 wherein the first current measurement circuit is adapted to measure sequentially the first node current and wherein the second current measurement circuit is adapted to measure sequentially the second node current.

27. The system according to claim 25 wherein the first slave electronic module comprises a first switch to form a path to ground for the first current measurement circuit during measurement of the first node current.

28. The system according to claim 25 wherein the second slave electronic module comprises a second switch to form a path to ground for the second current measurement circuit during measurement of the second node current.

* * * * *